Dec. 26, 1950     C. MICHAELIS ET AL     2,535,860
PORTABLE ICER
Filed March 27, 1947     7 Sheets-Sheet 3
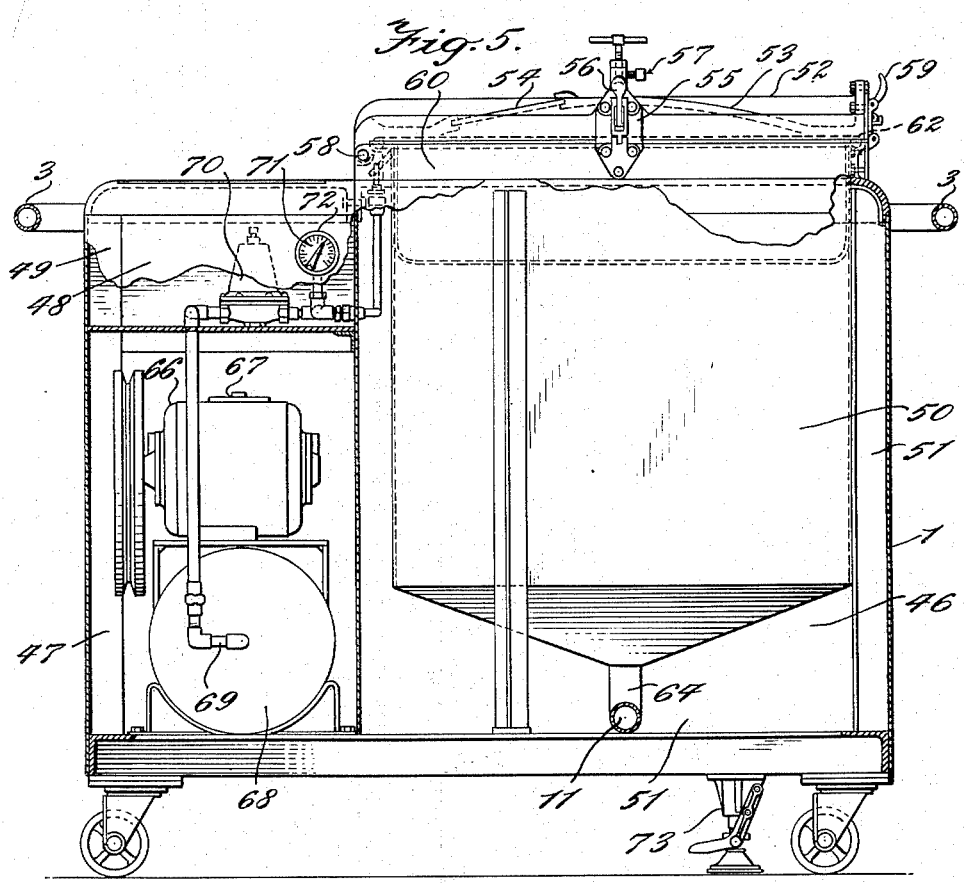
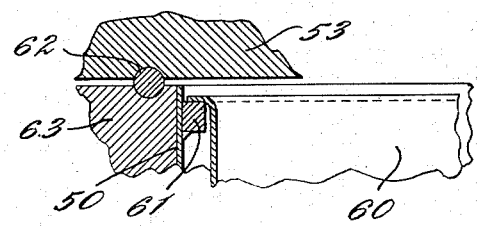
INVENTORS
CURT MICHAELIS
KURT PREUSS
ATTORNEYS Dec. 26, 1950

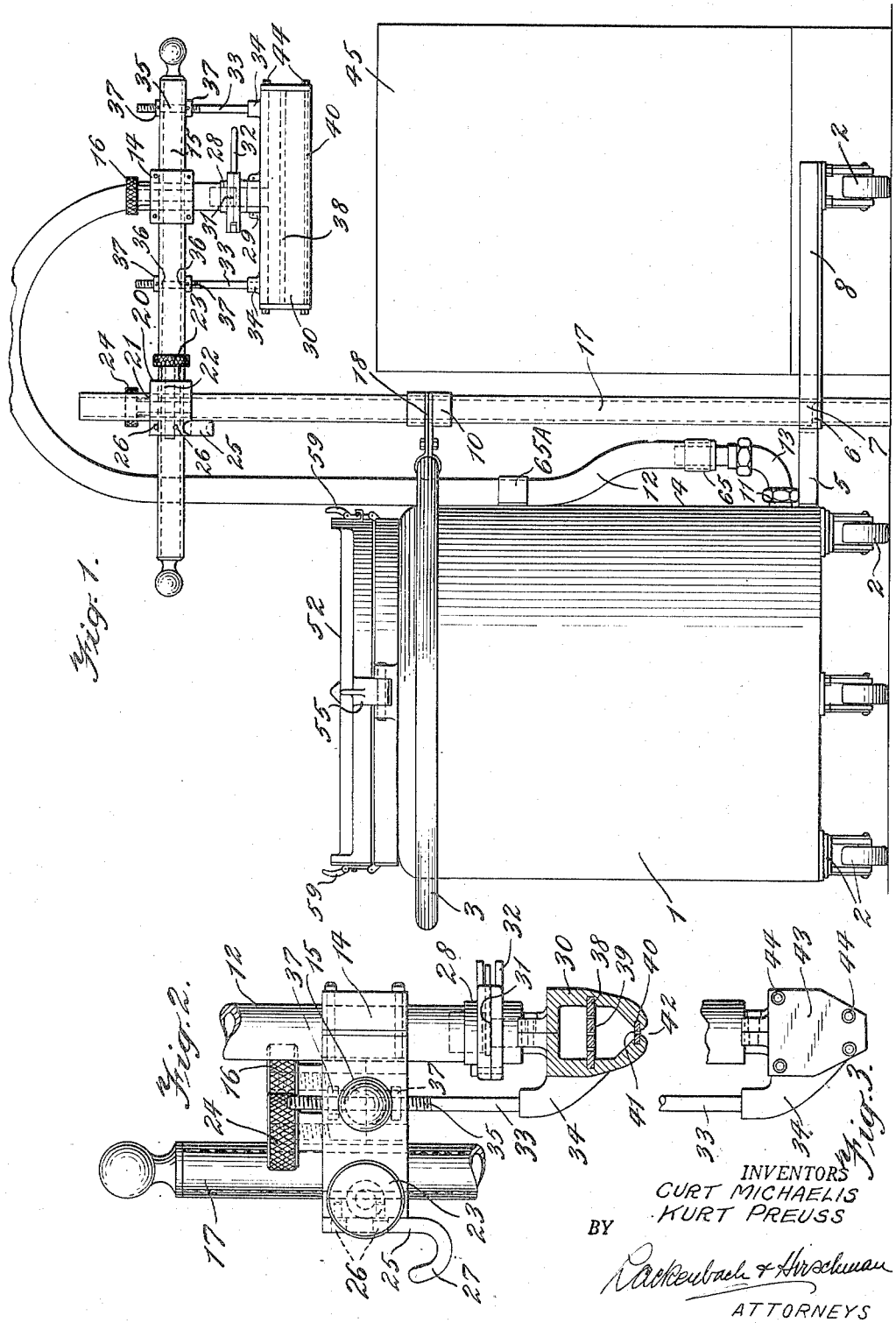

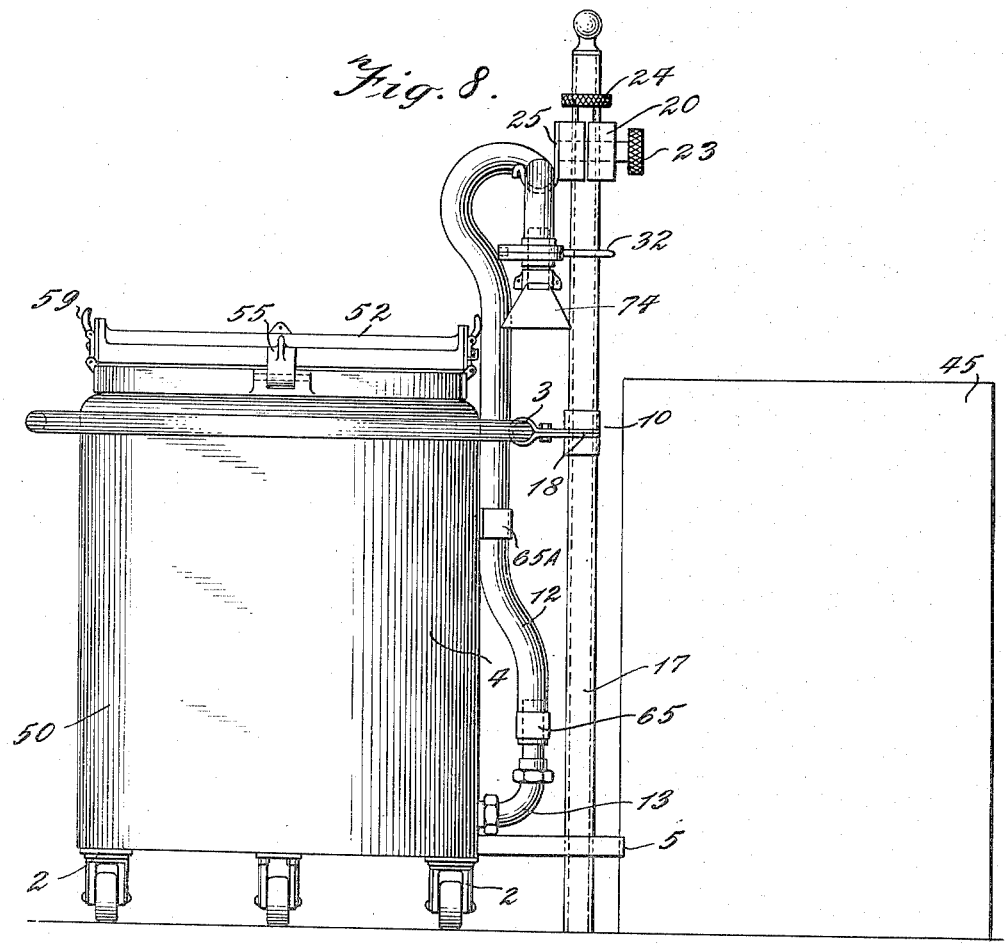
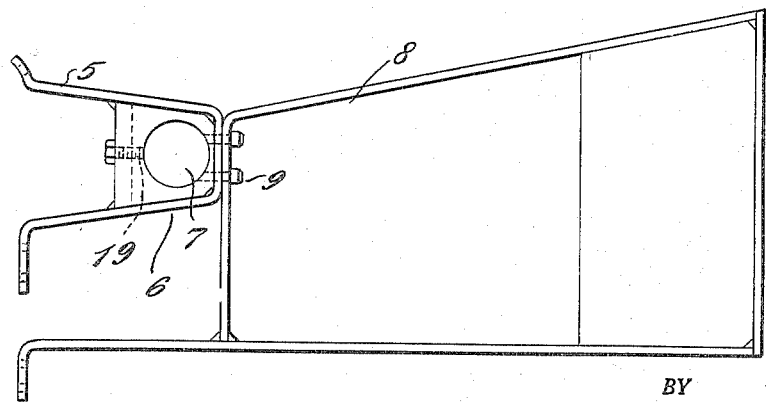

C. MICHAELIS ET AL 2,535,860

PORTABLE ICER

Filed March 27, 1947

INVENTORS
CURT MICHAELIS
KURT PREUSS
BY

ATTORNEYS

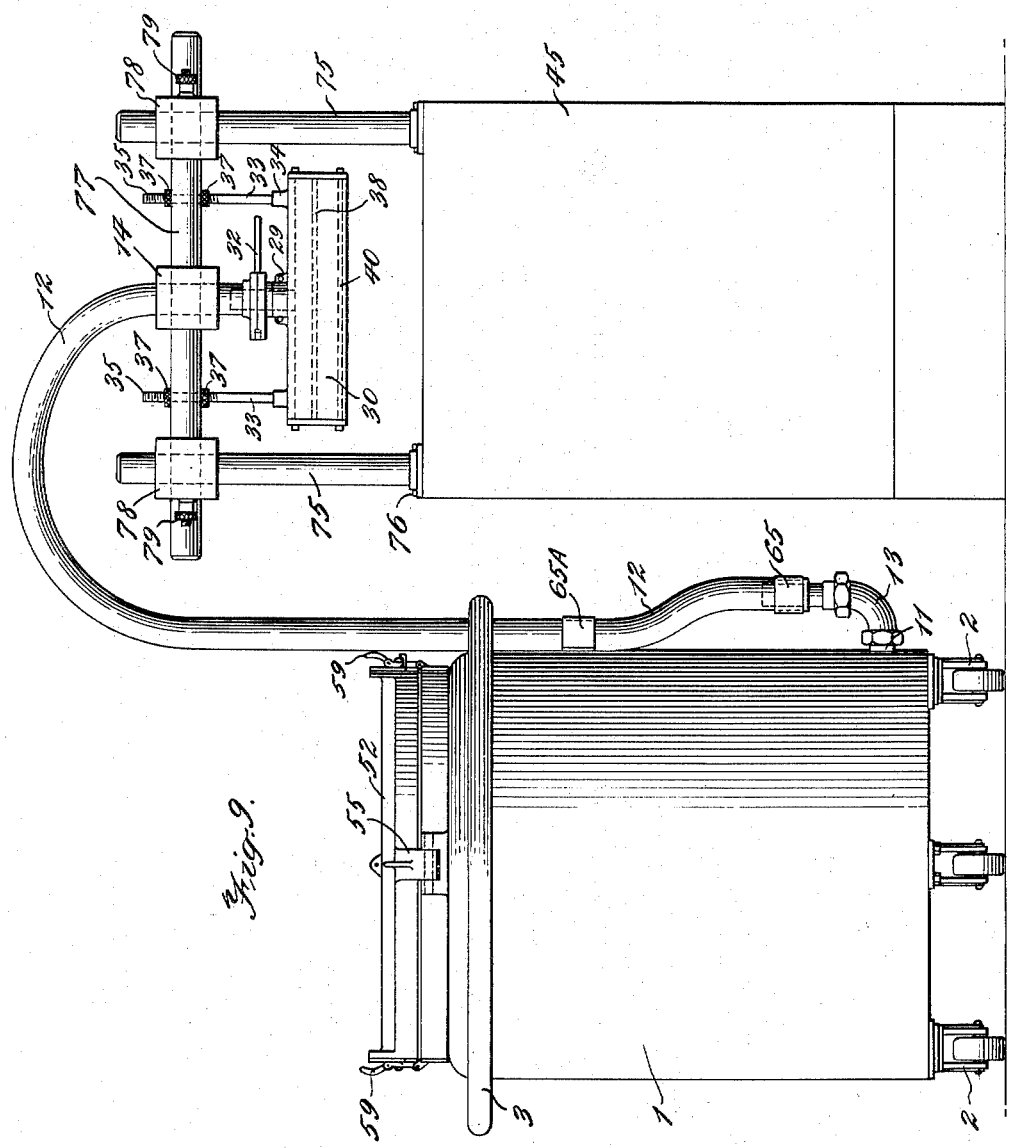

Dec. 26, 1950 C. MICHAELIS ET AL 2,535,860
PORTABLE ICER
Filed March 27, 1947 7 Sheets-Sheet 6
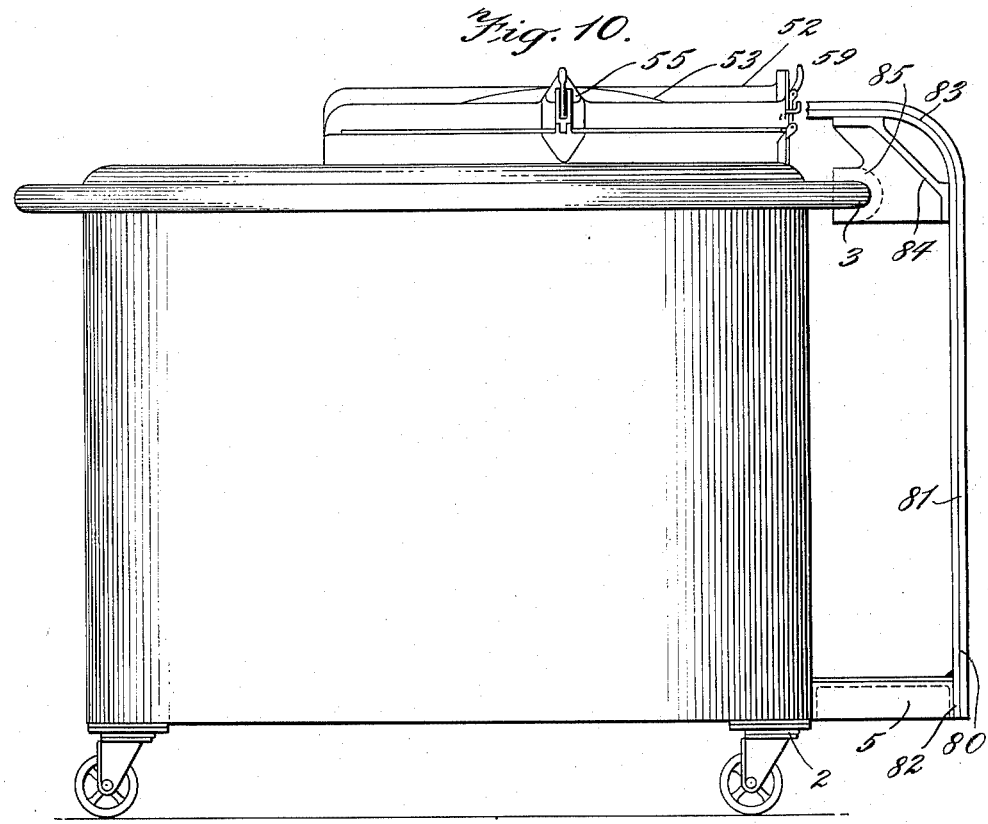
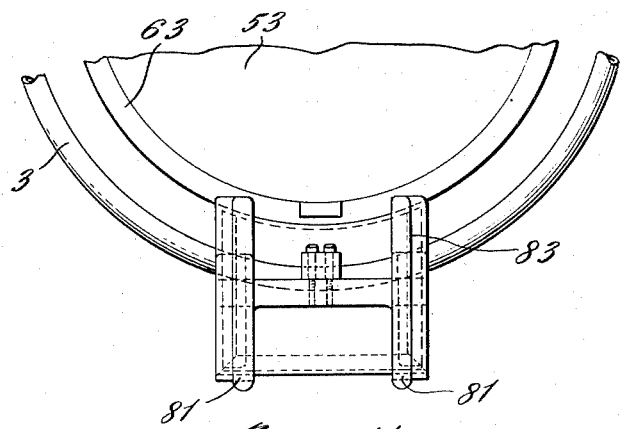
INVENTORS
CURT MICHAELIS
KURT PREUSS
BY
Rackenbach & Hirschman
ATTORNEYS

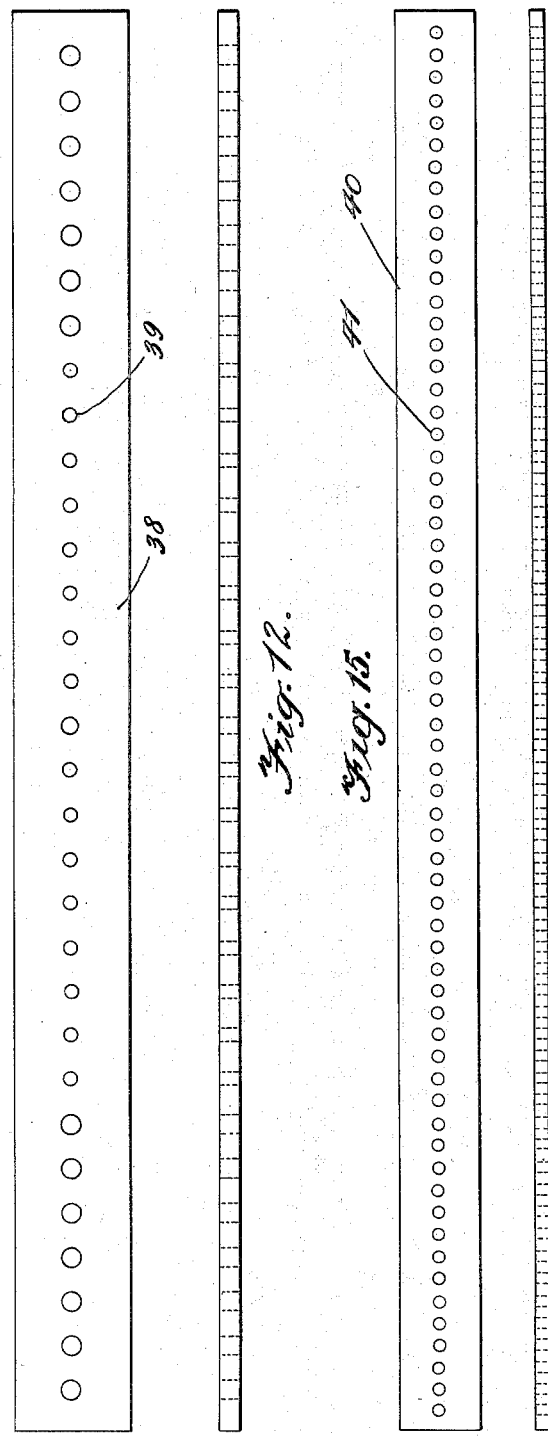

Patented Dec. 26, 1950

2,535,860

UNITED STATES PATENT OFFICE 2,535,860

PORTABLE ICER

Curt Michaelis, Weehawken, N. J., and Kurt Preuss, Forest Hills, N. Y., assignors to Curt Michaelis doing business as Basic Foods Company, Union City, N. J.

Application March 27, 1947, Serial No. 737,584

2 Claims. (Cl. 91—3)

This invention relates to apparatus for icing various pastries.

Different bakers of pastries use different types and size of conveyors depending on the type and size of pastry made. Icing the pastries is usually done by hand or a permanent set up of machinery and pastry conveyor.

It is therefore the main object of this invention to provide a portable icer capable of being used in any part of a plant with or without any type of pastry conveyor.

Another object of this invention is to provide an icer which is adapted for use as an automatic icing machine or as a hand operated one.

A further object of this invention is to provide an icing mechanism which is adapted for easy rearrangement of feeding combinations in accordance with specifications submitted by customers.

Another object of this invention is to provide a simple mechanism for loading and protecting the icing tank during the loading process.

Still another object of this invention is to provide a portable icer which will be simple to operate and which will need a minimum of adjustments, once the icing operation has begun.

Other objects and advantages will appear from the following description considered in connection with the accompanying drawings in which—

Fig. 1 is a rear elevational view of the icing tank showing one method of supporting the icing head.

Fig. 2 is a side elevational view of the icing head and its supporting mechanism partially in section.

Fig. 3 shows the end plate in position on the icing head.

Fig. 4 is a top plan view of the guard rail and the attachable dolly.

Fig. 5 is a side elevational view of the icing machine with the side wall removed.

Fig. 6 is an enlarged detail section of Fig. 5 of the upper extremity of the icing tank at the hinge point of the cover, showing the position of the icing sieve in such tank.

Fig. 8 is a rear elevational view of the icing tank showing the method of supporting a hand operated icing head.

Fig. 9 is a rear elevational view of the icing tank showing a method of attaching the icing head to the customer's conveyor in a fixed position.

Fig. 10 is a side elevational view of the icing machine showing the position of a detachable loading skid.

Fig. 11 is a plan view of a section of Fig. 10 showing the relation of the top of the skid to the tank top.

Fig. 12 is a side view of the valve plate used in the icing head.

Fig. 13 is a plan view thereof.

Fig. 14 is a side view of the distributor plate used in the icing head.

Fig. 15 is a plan view thereof.

Figure 7:
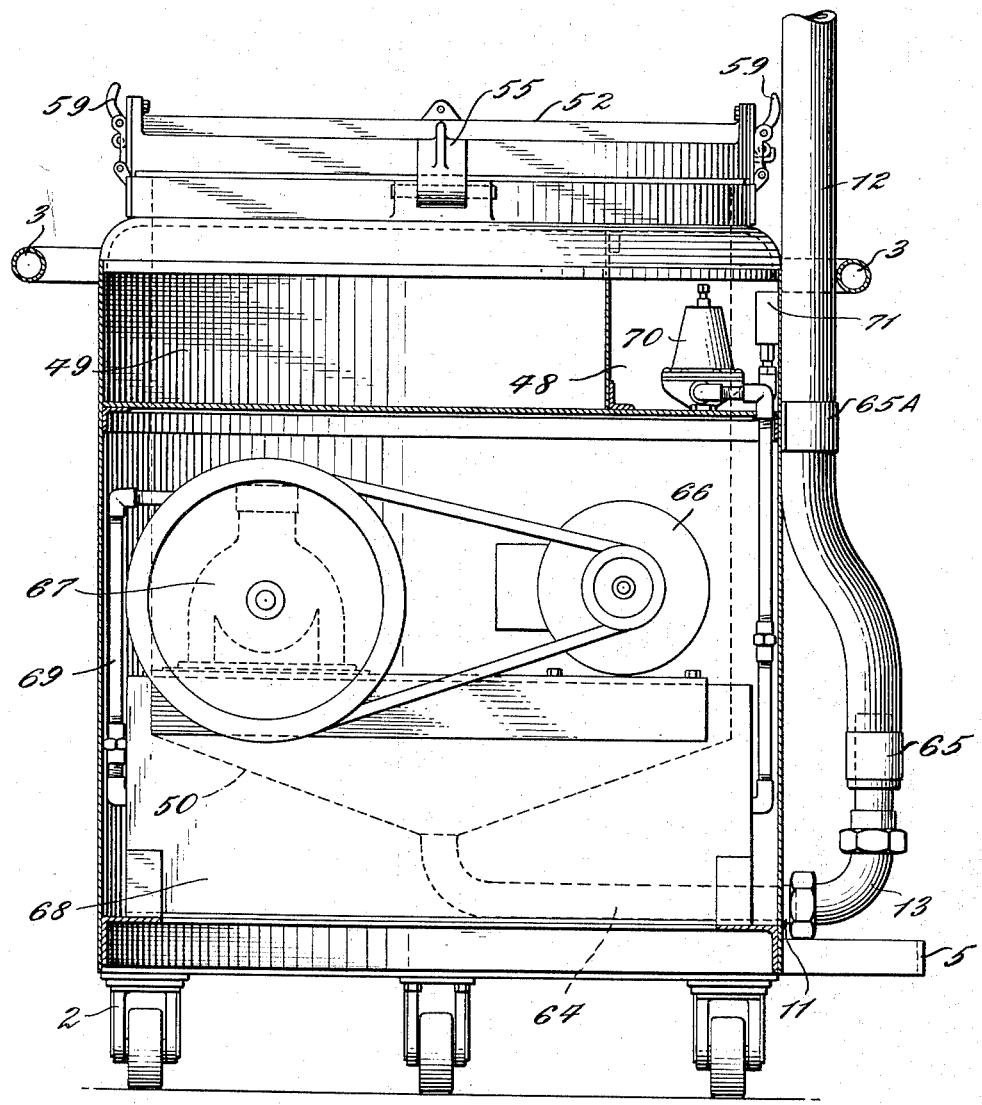
Fig. 7 is a rear elevation phantom view of the icing machine.

Referring now to the drawings and in particular to the icer shown in Figs. 1, 2, 3 and 4, this icer comprises a tank 1 supported by rotatable casters 2. This tank 1 has a hand rail 3 attached near the top of tank 1 and surrounding said tank 1. Attached to one side 4 of said tank 1 near the bottom is a guard rail 5 which has a projecting end base 6 having a hole 7 cut vertically through said base 6. An attachable dolly 8 having rotatable casters 2 is attached to the projecting end base 6 of guard rail 5 by means of bolts 9.

An adjustable clamp 10 is attached rigidly to the handrail 3 on the side 4 of said tank 1. To an outlet opening 11 situated near the bottom and center of said side 4 of said tank 1 is attached a flexible hose 12 by means of a curved fitting 13 so that said hose 12 runs vertically upward along the side 4 of said tank 1, curves downward and runs through an adjustable clamping block 14 which is in turn supported by a horizontal supporting arm 15. Said clamping block 14 is slidable along said supporting arm 15 and is tightened in position by means of a clamping stud 16.

A vertical supporting post 17 passes through an adjustable opening 18 located in said clamp 10 and through the opening 7 located in said end base 6 of the guard rail 5. A clamping stud 19 clamps the vertical supporting post 17 against the sides of the opening 7 of said end base 6. Clamp 10 also supports said supporting post 17 when it is tightened around said supporting post 17. A clamping block 20 having two openings 21 and 22 therein set at right angles to each other is slidable along said supporting post 17 which projects through opening 21. The horizontal supporting arm 15 projects through the opening 22 in said clamping block 20. A knurled tightening bolt 23 is used to clamp said clamping block 20 in a predetermined position along said vertical supporting post 17 while another tightening bolt 24 clamps said horizontal supporting arm 15 in a predetermined position within said opening 22 of the clamping block 20. A hook 25 is attached to one side of said clamping block 20 by means of studs 26 in such a position that the flexible hose 12 may rest within the curved portion 27 of said hook 25. Said flexible hose 12 is attached to a tubular metal fitting 28 which is in turn connected to a flange 29 of the feeding head 30. A valve 31 situated within the tubular fitting 28 can be opened or closed by means of an external lever 32 which projects from said tubular fitting 28.

Two depending supporting arms 33 are attached at their curved ends 34 to the rear of said feeding head 30. The other ends 35 of said supporting arms 33 are threaded and pass through openings 36 in said horizontal supporting arm 15 and are held in position by means of knurled nuts 37 which tighten on the upper and lower sides of said horizontal supporting arm 15.

The feeding head 30 is equipped with a valve plate 38 having various size holes 39 therein and a distributor plate 40 having the same size holes 41. The valve plate 38 lies horizontally along the median line of the feeding head 30 while the distributor plate 40 lies horizontally in the small feeder opening 42 located in the bottom of said feeding head 30. Various hole combinations on different valve and distributor plates may be interchanged by removing the end plate 43 which is held to the feeding head 30 by means of screws 44.

The feeding head 30 is suspended over the pastry conveyor 45.

Referring now to Fig. 5, which is a side elevational view of the icer, partially in section, comprising the main tank 1 having a plurality of compartments 46, 47, 48 and 49. In compartment 46, is located an icing tank 50 surrounded by fibre glass insulation 51 to maintain the temperature of the icing mix. The top 52 of said icing tank 50 is closed by a cover 53 having a Plexiglas peephole 54. Set in the top 52 of said icing tank is an air bleeder valve 55 provided with an automatic air release valve 56 which may be set at any predetermined pressure and a manual air release valve 57 whose function will be described hereinafter. The cover 53 is pivoted around a hinge 58 and is provided with three leverage locks 59 arranged one to each side and one in front of the icing tank cover 53. In the upper portion of the icing tank 50 is suspended a sieve 60 supported at intervals by a sieve support lug 61. Said sieve 60 being removable by lifting out of the icing tank 50. A round rubber gasket 62 provides an air-tight closure between the cover 53 and the tank support rim 63. A stainless steel piping 64 leads from the bottom of the icing tank 50 through an opening 11 in the side wall 4 of the icer tank 1 to the curved pipe fitting 13 which is connected to the flexible hose 12 by means of a hose clamp 65. Another clamp 65A holds the upright portion of the hose 12 against the side wall 4 of the tank 1.

In the second compartment 47 is located a motor 66, an air compressor 67 and a compressed air storage tank 68. An outlet pipe 69 leads from said storage tank 68 into the third compartment 48 which contains an air reducing valve 70 and an air guage 71, the face of which is set in an opening 72 located in the side wall of said main tank 1 for easy reading. The outlet piping 69 connects to said reducing valve 70 and said air guage 71 and empties into the top of said icing tank 50. A foot jack 73 is provided to lift the machine off one caster 2 to prevent movement of the machine during the icing operation.

The fourth compartment 49 is for parts and tools.

Referring now to Fig. 8, the embodiment shows a hand operated icing head 74 suspended from the hook 25 when not in use.

Referring to Fig. 9, the embodiment shows a stationary icing head 30 affixed to the customers' conveyor 45. Rigid mounting posts 75 are affixed to the top of the conveyor 45 by means of bolts 76. A horizontal supporting bar 77 is held in position along said vertical supporting post 75 by means of two clamping blocks 78 which are provided with locking studs 79 to permit raising or lowering of said horizontal supporting bar 77. The icing head 30 is suspended from this horizontal supporting bar 77 by means of the dependent supporting arms 33 as hereinbefore described.

Referring now to Fig. 10, and Fig. 11, the embodiment shows the portable icer with a loading attachment 80 comprising a pair of guide rails 81 arranged in vertical parallel relationship and supported at its lower end 82 by the guard rail 5. The upper portion 83 of said loading attachment is curved toward the tank cover 53 at right angles to the vertical guide rails 81 so that said curved upper portion 83 lies horizontal with the top of said tank 1 and slightly above it. A brace support 84 is built into the inner curve of said curved upper portion 83 to enable it to support a heavy loading bowl.

Said brace support 84 has a section 85 adapted to fit around said hand rail 3 so that said loading attachment 80 may be supported at the top by the hand rail 3 while the bottom part 82 of said loading attachment 80 is supported by said guard rail 5.

The operation of the device is as follows:

A bowl containing the icing mix is lifted along the guide rails 81 of the loading attachment 80 until the bowl rests on the upper horizontal portion 83 of said loading attachment 80. While in this position, the bowl is upended and the icing mix poured into the open top of the icing tank 50. Then the cover 53 is locked in position by means of the three quick engagement, quick release leverage locks 59.

The proper hole size valve plate 38 and distributor plate 40 are inserted in the icing head and the motor 66 and air compressor 67 are started up. The compressed air is forced into the compressed air storage tank 68 from which it is pumped through pipeline 69, the air reducing valve 70 and the air guage 71 to the top of the icing tank 50. The icing charge may be inspected during operation through the Plexiglas window 54 situated in the top of the icing tank cover 53. The icing is now forced from the bottom of the icing tank 50 through stainless steel sanitary piping 64, fitting 13 and a flexible rubber hose 12 to the icing head 30 where the speed of the icing feed is observed. Since no two batches of icing mix have the exact same consistency, this observation is necessary before the operator adjusts the reducing valve 70 and the automatic air release valve 56 to provide the proper pressure for a predetermined icing feed. Once this is adjusted, the operator watches the air guage 71 to be assured that the proper pressure is being maintained. The icing head 30 may be held over the customers' pastry conveyor 45 by means of the horizontal adjustable supporting arm 15 which is in turn supported by a vertical adjustable supporting post 17. By means of the adjustable clamps 10 and 6 the supporting post 17 may be lifted off the ground to permit movement of the portable unit. However, when said icer has been trundled into the proper position, the supporting post 17 is lowered until its bottom rests on the floor and then the clamps 10 and 6 are retightened. In addition, by loosening clamping nut 23 of the clamping block 20, said clamping block 20, which carries the horizontal supporting arm 15, may be raised or lowered along the length of said supporting post 17. Said horizontal supporting arm 15, which carries the icing head 30 may also be adjusted horizontally through said clamping block 20 by means of a clamping nut 24. Also, said horizontal arm 15 may be rotated around said vertical supporting post 17 when said clamping nut 23 is backed up slightly.

Should the operator wish to cut-off the flow of icing suddenly, he throws the lever 32 which closes an internal valve 31 situated across the opening leading from the hose fitting 29 into the icing head 30. A manual air release valve 57 is also provided for the operator to release all the air pressure in the icing tank 50 before opening the cover 53.

When the horizontal arm 15 is to be used, an attachable dolly 8, equipped with rotatable casters 2, is provided to prevent the machine from tipping over. Said attachable dolly 8 is attached by means of bolts 9 to the side of the guard rail 5. When said icer is trundled alongside the customers' conveyor 45, said dolly 8 slides underneath said conveyor 45.

When the icing feed head 30 is to be mounted on the customers' conveyor 45, the embodiment shown in Fig. 9 is used. In that arrangement, the icing head 30 and its supporting horizontal arm 77 may be raised or lowered by loosening the stop nuts 79 which clamp the pair of supporting blocks 78 along the pair of supporting vertical posts 75 which are firmly bolted to the top of the customers' conveyor 45.

Where hand operation is desired, the clamping block 20 is used without the horizontal supporting bar 15 as shown in Fig. 8 of the drawings. The operator moves the icing head 74 by hand over the moving pastries on the conveyor 45. When said operator is finished with a particular batch of pastries, he can hang the icing head 74 on the hook 25 attached to the clamping block 20 by looping the rubber feeding hose 12 over said hook 25.

Should the operator wish to change the type of icing feed to the pastries, then he removes the end plate 43 by unscrewing the holding bolts 44 and replaces either the valve plate 38 or distributor plate 40 or both depending on the pattern he wishes to obtain.

A further embodiment is provided to enable the operator to load the icer without marring the finish of said icer. The loading skids 81 which perform this function are shown in Figs. 10 and 11 of the drawings. The mixing bowl (not shown) is lifted along the skid rails 81 until said bowl is resting on the top 83 of said loading attachment 80. The mixing bowl is then tilted until the icing mix flows into the icing tank 50.

As will be seen from the above description, the invention discloses a versatile icing machine capable of being operated in various manners in connection with a plurality of attachments. This provides a portable icer, hand or automatically operated, and which is adaptable to innumerable combinations of icing feeds and positions. The device may be completely portable and independent of a customers' conveyor or it may be attached to the conveyor during the icing process. In addition to being flexible in the arrangement of varied combinations, the portable icer enables the operator to use the basic equipment to which may be attached any of the combinations mentioned above.

While, in disclosing the principles of our invention and its preferred embodiment, we have described various detailed structure and relationship, it will be understood that such embodiment and details are given by way of example only and not as limiting the scope of our invention.

We claim:

1. A substantially completely self-contained portable icer to be utilized in conjunction with a conveyor structure carrying products to be iced, comprising a tank having a plurality of compartments, means in one of said compartments for increasing air pressure, means for regulating said air pressure, an icing tank situated in another of said compartments, interconnecting pipes to supply said icing tank with air pressure from said means for increasing said air pressure, an icing head, interconnecting pipes for supplying said icing head with icing from said icing tank, a vertical supporting post secured to said tank, a horizontal supporting arm secured to said vertical supporting post, said icing head being secured to said horizontal supporting arm, means for fixing said horizontal supporting arm in a plurality of vertical positions relative to said vertical supporting post and means for fixing said horizontal supporting arm horizontally at a plurality of points along its length to said vertical post and at a plurality of positions angularly about said vertical post.

2. A portable icer as claimed in claim 1 including means for positioning said vertical supporting post in a plurality of vertical positions relative to said tank.

CURT MICHAELIS.
KURT PREUSS.

REFERENCES CITED

The following references are of record in the file of this patent:

UNITED STATES PATENTS

| Number | Name | Date |
|---|---|---|
| 1,139,353 | Ellis | May 11, 1915 |
| 1,295,451 | Duffy | Feb. 25, 1919 |
| 2,431,029 | Duffy | Nov. 18, 1947 |

FOREIGN PATENTS

| Number | Country | Date |
|---|---|---|
| 421,807 | France | 1911 |
| 16,011 | Great Britain | 1914 |